(12) United States Patent
Godwin et al.

(10) Patent No.: US 7,292,604 B2
(45) Date of Patent: Nov. 6, 2007

(54) DEVICE AND METHOD FOR EFFICIENT DELIVERY OF REDUNDANT NATIONAL TELEVISION SIGNALS

(75) Inventors: John P. Godwin, Los Angeles, CA (US); Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 292 days.

(21) Appl. No.: 10/800,581

(22) Filed: Mar. 15, 2004

(65) Prior Publication Data

US 2004/0174835 A1 Sep. 9, 2004

Related U.S. Application Data

(60) Division of application No. 10/145,963, filed on May 15, 2002, now Pat. No. 6,728,269, which is a continuation-in-part of application No. 09/893,094, filed on Jun. 26, 2001, now Pat. No. 6,501,770, which is a continuation of application No. 09/199,702, filed on Nov. 25, 1998, now Pat. No. 6,278,717, which is a continuation of application No. 08/708,524, filed on Sep. 5, 1996, now Pat. No. 5,886,995.

(51) Int. Cl.
 *H04L 12/56* (2006.01)
 *H04B 10/105* (2006.01)

(52) U.S. Cl. ............... 370/477; 370/312; 370/432; 725/35

(58) Field of Classification Search ........... 370/312, 370/316, 432, 477; 725/32–36
See application file for complete search history.

(56) References Cited

U.S. PATENT DOCUMENTS

| | | | |
|---|---|---|---|
| 4,541,008 A | 9/1985 | Fishman et al. | |
| 4,581,737 A | 4/1986 | Sparrell | |
| 5,121,430 A | 6/1992 | Ganzer et al. | |
| 5,155,591 A | 10/1992 | Wachob | |
| 5,200,823 A | 4/1993 | Yoneda et al. | |
| 5,260,778 A * | 11/1993 | Kauffman et al. | 725/33 |
| 5,276,679 A | 1/1994 | McKay et al. | |
| 5,371,547 A | 12/1994 | Siracusa et al. | |
| 5,381,412 A | 1/1995 | Otani | |
| 5,392,284 A | 2/1995 | Sugiyama | |
| 5,412,416 A | 5/1995 | Nemirofsky | |
| 5,418,782 A | 5/1995 | Wasilewski | |

(Continued)

FOREIGN PATENT DOCUMENTS

EP 0508654 A2 10/1992

(Continued)

OTHER PUBLICATIONS

*Program Guide for Digital Television: ATSC Standard, Advanced Television Systems Committee,* Jan. 3, 1996, Doc. A/55, pp. 1-48.

(Continued)

*Primary Examiner*—Wellington Chin
*Assistant Examiner*—Ahmed Elallam

(57) ABSTRACT

A method and apparatus of broadcasting is provided that has a geographic identifier memory, an overlay memory storing an overlay, a receiver circuit for receiving a broadcast signal and a control circuit. The control circuit displays the overlay on the broadcast signal in response to the geographic identifier.

14 Claims, 3 Drawing Sheets

U.S. PATENT DOCUMENTS

| | | | |
|---|---|---|---|
| 5,420,866 A | 5/1995 | Wasilewski | |
| 5,432,542 A | 7/1995 | Thibadeau et al. | |
| 5,446,919 A | 8/1995 | Wilkins | |
| 5,499,046 A | 3/1996 | Schiller et al. | |
| 5,563,883 A | 10/1996 | Cheng | |
| 5,563,892 A | 10/1996 | Kostreski et al. | |
| 5,565,909 A | 10/1996 | Thibadeau et al. | |
| 5,600,378 A | 2/1997 | Wasilewski | |
| 5,619,274 A | 4/1997 | Roop et al. | |
| 5,642,153 A | 6/1997 | Chancy et al. | |
| 5,652,615 A | 7/1997 | Bryant et al. | |
| 5,742,732 A | 4/1998 | Kubo et al. | |
| 5,886,995 A | 3/1999 | Arsenault et al. | |
| 5,995,553 A | 11/1999 | Crandall et al. | |
| 6,003,041 A | 12/1999 | Wugofski | |
| 6,278,717 B1 | 8/2001 | Arsenault et al. | |
| 6,301,248 B1 | 10/2001 | Jung | |
| 6,401,242 B1 | 6/2002 | Eyer et al. | |
| 6,473,858 B1 | 10/2002 | Shimomura et al. | |
| 6,477,579 B1* | 11/2002 | Kunkel et al. | 709/229 |
| 6,487,721 B1 | 11/2002 | Safadi | |
| 6,546,427 B1 | 4/2003 | Ehrlich et al. | |
| 6,577,849 B1 | 6/2003 | Eaton et al. | |
| 6,718,551 B1* | 4/2004 | Swix et al. | 725/32 |
| 2002/0087974 A1* | 7/2002 | Sprague | 725/32 |
| 2002/0092017 A1* | 7/2002 | Klosterman et al. | 725/35 |
| 2002/0144260 A1* | 10/2002 | Devara | 725/32 |
| 2002/0166119 A1* | 11/2002 | Cristofalo | 725/34 |
| 2002/0194589 A1* | 12/2002 | Cristofalo et al. | 725/32 |
| 2003/0106070 A1* | 6/2003 | Saam | 725/135 |
| 2003/0145320 A1* | 7/2003 | Vogel | 725/22 |
| 2004/0128682 A1* | 7/2004 | Liga et al. | 725/35 |
| 2004/0163101 A1* | 8/2004 | Swix et al. | 725/9 |
| 2005/0010949 A1* | 1/2005 | Ward et al. | 725/42 |
| 2006/0015904 A1* | 1/2006 | Marcus | 725/46 |

FOREIGN PATENT DOCUMENTS

| | | |
|---|---|---|
| JP | 3-270488 | 12/1991 |
| JP | 7-111648 | 4/1995 |
| WO | WO 94/19881 | 9/1994 |
| WO | WO 96/13124 | 5/1996 |
| WO | WO 97/16020 | 5/1997 |

OTHER PUBLICATIONS

*System Information for Digital Television: ATSC Standard, Advanced Systems Committee*, Jan. 3, 1996, Doc. A/56, pp.1-7.
*Digital Broadcasting Systems for Television, Sound And Data Services: Specification For Service Information (SI) In Digital Video Broadcasting (DVB) Systems, European Telecommunications Standards Institute*, DRAFT, pr ETS 300 468, Oct. 1994, pp. 1-51.

* cited by examiner

DEVICE AND METHOD FOR EFFICIENT DELIVERY OF REDUNDANT NATIONAL TELEVISION SIGNALS

CROSS-REFERENCE TO RELATED APPLICATIONS

This application is a divisional application of U.S. patent application Ser. No. 10/145,963, filed May 15, 2002 for "DEVICE AND METHOD FOR EFFICIENT DELIVERY OF REDUNDANT NATIONAL TELEVISION SIGNALS" by John P. Godwin and Robert C. Arsenault, now issue as U.S. Pat. No. 6,728,269, which is a continuation-in-part of U.S. patent application Ser. No. 09/893,094, filed Jun. 26, 2001, entitled "DYNAMIC MAPPING OF BROADCAST RESOURCES" by Robert G. Arsenault, Tam T. Leminb, and Thomas H. James, now issued as U.S. Pat. No. 6,501,770, which is a continuation of U.S. patent application Ser. No. 09/199,702, filed Nov. 25, 1998, entitled "DYNAMIC MAPPING OF BROADCAST RESOURCES" by Robert G. Arsenault, Tam T. Leminh, and Thomas H. James, now issued as U.S. Pat. No. 6,278,717, which is a continuation of U.S. patent application Ser. No. 08/708,524, filed Sep. 5, 1996, entitled "DYNAMIC MAPPING OF BROADCAST RESOURCES" by Robert G. Arsenault, Tam T. Leminh, and Thomas H. James, now issued as U.S. Pat. No. 5,886,995, all of which applications are hereby incorporated by reference herein.

TECHNICAL FIELD

The present invention relates in general to the processing of high data rate information signals. In particular embodiments it relates to processing of video, audio and/or data information in a direct broadcast satellite (DBS) consumer entertainment system that allows local identity while eliminating redundant programming.

BACKGROUND OF THE INVENTION

The information carrying capacity of any data network is limited by, among other things, its effective bandwidth. Limitations in available bandwidth, resulting from technical limitations of the processing and transmission elements (e.g. transmission line limitations), from government limitations (e.g. limited RF spectrum allocation), or otherwise, restrict the amount of information which can be carried by the related system. This may result in a limitation on the quantity or quality (or both) of the services which may be provided by the system, often requiring compromises or tradeoffs.

Transmission of television programming to home viewers has long been subject to the these limitations and tradeoffs. Terrestrial RF broadcasts are limited in a given locality to a few frequency bands (channels) allocated by government authority for television transmission, and selected to be noninterfering over the limited range of the transmission. The frequency band allocated to each channel was selected to accommodate the then-standard transmission scheme employed (e.g. NTSC in the United States), and to minimize or avoid out-of-band interference. Although additional frequencies (e.g. UHF in the United States) were later allocated, restrictions on available RF spectrum have long limited the number of programs which could be made available to the consumer.

Distribution of program material via cable networks provided additional bandwidth to broadcasters (i.e. cable operators), overcoming in part the restriction imposed by scarcity of available RF spectrum. However, cable systems are technically limited to the useable bandwidth of the network, including the transmission line and associated electronics.

Advances in signal processing technology have permitted more programming information, improved quality, and new services (e.g. data services) to be transmitted within a given available bandwidth. For example, digital processing of both video and audio signals, together with advances in encoding and compression techniques (e.g. MPEG-2), have permitted a reduction in the bandwidth required for transmission of video and audio signals of acceptable quality, and/or transmission of higher quality video and audio signals. Together with advances in the associated transmission and reception equipment allowing greater utilization of available spectrum, a dramatic increase in the amount of user programming that can be transmitted over a given medium is possible. In addition, systems have been developed to utilize alternative delivery systems and other portions of the RF spectrum. For example, direct broadcast satellite (DBS) systems provide entertainment and information broadcasts directly to consumers in some cases by means of high power satellite transponders and small (e.g. 18-inch) consumer receiving dishes. Although one such system is today capable of transmitting over 225 channels of video, audio and/or data programming at higher quality levels than previously known there remains a desire to provide additional transmission capability and to fully utilize all available bandwidth for benefit of the consumer.

Distribution systems, whether broadcast (satellite or terrestrial), coaxial cable, optical, or otherwise, typically provide a plurality of accessible broadcast resources. In an early model, a terrestrial television broadcast system included a number of individual channels or frequency bands, selectable by the consumer. Taking the television system as a whole, each channel available in a given locality provided a broadcast resource accessible by the users in that region and capable of carrying a single video/audio program. Similar frequency division multiplexing on known analog cable systems provides a generally larger number of broadcast resources in the system, again each typically carrying a single program including both video and audio, selectable as a viewer channel. In a digital DBS system, frequency and polarization division multiplexing (e.g. multiple transponders operating with distinct frequencies and with two polarizations) and data packet multiplexing (e.g. within a given frequency) may be used. In this context, each individually addressable bitstream (i.e. each individual packet virtual circuit on each selectable frequency and phase) may be considered as a separate "broadcast resource." Where different satellite locations or different delivery media are also employed in an extended system, selection of the desired satellite and transmission media, etc., is also part of identifying an individual broadcast resource.

A broadcast service will therefore have available to it a limited number of broadcast resources. If the quality of individual transmissions can be acceptably reduced, additional broadcast resources might be supported within a given RF spectrum allocation. However, the number of broadcast resources available for transmitting high quality video, audio and data programming remains limited.

A broadcaster or service provider desires to transmit to its customers (e.g. subscribers) the maximum number of programs possible utilizing the available transmission system, at the highest relative quality. As used herein, "programs" shall include television programming, audio programs, and/or data transmission of various types (e.g. software, control codes, multimedia content, digitized pictures, data, etc.). A program may include more than one form of data, such as video and one or more audio, and in some embodiments, associated data. Each of these data streams may, in preferred embodiments, be transmitted over separate broadcast resources.

A large number of content providers exist today and make available to broadcasters one or more content streams comprising programs and related content (e.g. program IDs, commercials, etc.). Many of these streams are continuous or substantially continuous, and are distributed by the content provider through various distribution media (e.g. satellite, cable, or prerecorded media) to, among other potential recipients, other broadcast services for retransmission to their viewers. For example, numerous regional sports networks exist which assemble program streams containing sporting events, often with sports-related "filler" in the times between individual sporting events.

Although content providers often generate original programs (e.g. by covering a live sporting event), it is common in the industry for one content provider to purchase programs or filler from another content provider. For example, a sports network might purchase retransmission rights to a sporting event being covered by another service provider. In these cases, the purchasing provider receives a program feed from the distribution medium (e.g. satellite) utilized by the originating provider, then retransmits this signal to its customers (e.g. cable system operators for further retransmission to consumers, or directly to consumers). The purchasing provider may insert its own commercials or identity, or may elect to use the purchased feed in its "raw" form. Often several service providers will purchase and carry the same programming originated by another provider.

A multi-channel broadcast system will typically purchase a number of input program streams from a number of content providers, for retransmission to viewers or subscribers of that system. In a digital transmission system, each individual program stream can be viewed as a continuous input data stream, where the data represents video, audio, or other (e.g. multimedia or data) information, and will be referred to herein as an "input data stream." A given program may comprise one or more than one input data streams (e.g. one or more video inputs, one or more associated audio inputs, and associated data relating to the program content). Transmitting a given number of input data streams to a number of viewers, such that each data stream is potentially available to users at all times, has typically required at least an equal number of broadcast resources.

In particular, at the transmission end each input data stream is typically assigned to an available broadcast resource. Each input data stream is therefore allocated or "mapped" to a unique broadcast resource. The correspondence matrix identifying the input stream-to-broadcast resource relationships may be considered as a "map". Because the map used at the transmission end is remote from the user (e.g. subscriber), it will be referred to herein as a "remote" map.

At the receiving end, a similar map has been used to allocate the data streams received from the broadcast resources to unique, selectable outputs. Each individual output bitstream, corresponding to a particular broadcast resource bitstream, may be referred to as an "output data stream." When a user selects a particular channel (e.g. channel 101) they expect to receive a particular program at a particular time. The receiving device accomplishes this by maintaining a complimentary receiver or "local" map which specifies the correspondence between broadcast resources and selectable outputs. In some instances, where the desired output consists of information carried over just one broadcast resource, the local map will specify correspondence between that broadcast resource and the selected output, which will consist of a single output data stream. For example, if the video and audio components of a program are encoded into a single input data stream, then selection of a program or viewer channel requires mapping of only one data stream, with the components being separated by other processors. In other instances (e.g. a movie having one or more video options, a plurality of selectable high quality audio, and/or optional related data), selection of a desired output may require mapping multiple output data streams to the corresponding broadcast resources. In these instances, the user selects a desired "viewer channel" (e.g. channel 101) and makes any optional selections (e.g. alternate audio), and the local map identifies the necessary output data streams and maps them to appropriate broadcast resources. These output data streams may be directed to an appropriate processing or performance device, such as (without limitation) a television display, audio processor, or computer. Where options are available (e.g. alternate audio), the selected option may be mapped to an output corresponding to a related processor based on a user select input, or all of the options may be mapped to a processor which itself isolates the appropriate output. In specific embodiments, components of different programs (e.g. video from a first program and audio from a different source) may be locally mapped to an output viewer channel, thereby creating a hybrid derived output.

It is important that both the remote and local maps correspond at any given time, so that selection by the user of a viewer channel will map the receiving circuitry to the correct broadcast resource(s) which, in turn, are mapped to the input data stream(s) desired by the user. It is known to modify the allocation maps from time to time. This may be done, for example, when a broadcast resource becomes unavailable, or when a reallocation of bandwidth provided by individual resources is required, such as when new input data streams are added to, or old ones removed from, a system. Such map changes have been infrequent, however, typically one to three times per day.

Technology also exists to locally generate derivative output data streams or viewer channels which do not correspond to any single input data stream. For example, a local processor may map a particular viewer channel to a first set of one or more broadcast resources during a first time period, then map that viewer channel to a different set of broadcast resources during a subsequent time period. In this manner, a processor has been able to provide viewers with a greater number of viewer channels than the number actually broadcast.

For purposes of the ensuing description and claims, the following notation convention may be useful. The numerical correspondence between individual input data streams and individual broadcast resources (related to the remote map), and the numerical correspondence between those broadcast resources and individual output data streams (related to the local map), may be given as IN:BR:OUT, where IN equals the number of discrete input data streams, BR represents the number of discrete broadcast resources, and OUT represents the number of discrete output data streams. In the simplest 1:1:1 correspondence, n input data streams are mapped to n broadcast resources, which are in turn mapped to n output data streams, or n:n:n. As previously noted, it is also known to generate derivative channels, which may be represented as n:n:n+x correspondence or mapping, where n and x are integers greater than or equal to one. In this example, although a 1:1 correspondence exists between input data streams and broadcast resources, a 1:>1 mapping is performed by the local map, resulting in x derivative output channels.

Although revision of the maps to accommodate infrequent changes in the input data streams or active broadcast resources, and n:n:n+x mapping to locally generate derivative channels, have provided a useful degree of flexibility in the operation of existing systems (e.g. high capacity DBS), it would be useful to reduce the amount of bandwidth required to carry desired programming, thereby allowing additional services and/or higher quality services to be carried by the same broadcast resources.

It is also known that certain control and configuration information must be transmitted, in addition to the desired input data streams. Using channel maps introduces difficulties in generating and maintaining an accurate local map which reflects the current utilization of broadcast resources. Changes in the utilization of resources over time require the local map to be updated, typically by transmitting or downloading a new map to a viewer's receiver such as (for a typical DBS system) an integrated receiver/decoder (IRD). For a system having a large number of channels (i.e. 225 or more), the local map may comprise a matrix of several thousand bytes of data listing the appropriate broadcast resources for each viewer channel, for one or more time periods. Such "overhead" data transmission requires bandwidth which is therefore not available for delivery of desired consumer services. In the case of infrequent map updates, this overhead has been tolerable, although not desired. If the complexity or size of the local map were increased, or if revisions to the local map were frequent, the amount of overhead bandwidth required could become quite large.

Transmission of local map data also requires time, the amount of which depends on the amount of map data and the allocated effective baud rate. Other sources of delay in generating and activating an updated map may also exist. For example, an IRD ordinarily continues to use a map until it determines the complete transmission of a more recent, updated map. Typically the IRD checks for the existence of an updated map at only predetermined intervals. Thus, another source of delay is introduced in activating a new local map.

The time delays involved with transmitting updated local maps to IRDs have also made maintaining updated maps cumbersome. The transmission of updated maps has thus been typically limited to a fixed number of predetermined times during the broadcast day, e.g. two or three times per day. Changes in the utilization of broadcast resources are therefore limited by the practical ability to update the local map. Improved flexibility in updating channel maps would allow greater flexibility in maximizing the utilization of broadcast resources.

U.S. Pat. No. 5,886,995 has provided a system whereby broadcast resources are conserved. In the '995 patent, a program guide system is used to create the look and feel of a unique local channel for each local market. The local map appears to have the identifier of the local channel but, the same video from another channel is used in place of the actual local channel feed. One drawback to such a system is that the local channel identifier such as logo displays which are broadcast from the local channels are not displayed on screen. Local channels may therefore object to substituting a national feed for their local feed during particular times. Another problem with such systems is that the local emergency messaging system that provides information such as severe weather alerts may also be eliminated during time periods with redundant signals. U. S. Pat. No. 5,886,995 is hereby incorporated by reference.

It would therefore be desirable to provide a broadcast system that reduces redundant signals so that further content may be provided without losing local identity.

SUMMARY OF THE INVENTION

The present invention relates to a transmission distribution system which conserves transmission bandwidth by consolidating the broadcast of simultaneous common programming from a number of different program streams comprising a number of input data streams, onto a lesser number of broadcast resources by using a unique mapping scheme while allowing the individual identity or other overlay of each of the channels to be displayed at the user device. Program information may include, but is not limited to, television programming, audio programming, and/or various data services.

For example, in a television system having a large number of viewer channels, a number of different input data (e.g. program) streams may include the same programming material at a given time or times. Such simultaneous common programming typically occurs during sporting events or other live telecasts (e.g. special news events). The present invention allows all or a portion of such simultaneous programming to be broadcast over a lesser number of allocated broadcast resources, preferably a single broadcast resource for each program or program component (e.g. video, audio1, audio2, etc.), and locally mapped to the appropriate multiple viewer channels. In this manner, output data streams can be generated locally which are identical or sufficiently identical in relevant content to the numerous input data streams, although a reduced number of broadcast resources are utilized. The difference between the number of broadcast resources previously required to transmit each input data stream separately (n), and the lesser number required by the present invention (n-y), represents newly-available broadcast resources (y) which may be used for beneficial purposes. The output data streams can then be overlaid with overlay data such as logos or emergency messaging information.

These broadcast resources and bitstreams are thus available for transmission of alternate data (e.g. additional program information or data services) or higher-quality transmission of existing services (e.g. HDTV or AC3 audio).

In a preferred embodiment, the capacity thus made available for alternate use in successive time slots are concatenated to generate one or more substantially continuously available broadcast resources. For example, a first broadcast resource might be "freed-up" as a result of the inventive mapping discussed above, from 1:00 p.m.-3:00 p.m. A second broadcast resource might be "freed-up" from 3:00 p.m.-5:00 p.m., etc. A remote map can be generated to map the programming which would otherwise be allocated to a particular broadcast resource, instead onto these "new" resources during these time periods, thus freeing that particular resource. In other embodiments, the alternate programming or data service can itself be distributed among the several broadcast resources made available during individual time slots, and reconstructed by means of a suitable local map.

In aspects of the invention, the channel mapping described is dynamically updated. It may, for example, be synchronized to frequent (e.g. real-time) changes in the desired utilization of particular broadcast resources, to accommodate dynamically changing similarity or identity between certain input data streams. By way of example, the mapping may be modified as often as required, and when required, in order to generate at least n output data streams sufficiently identical in relevant content to n input data streams, by means (at least periodically) of fewer than n broadcast resources. By dynamically adjusting the necessary mapping as required to meet such changing circumstances (i.e. as redundant programs begin and end on one or more sets of input data streams, or as non-common content such as desired commercials or source identifications occur in programs involved in n:n-y remote mapping, or as load requirements on the transmission media vary), maximum utilization of available broadcast resources can be achieved.

To accomplish the flexibility of dynamic channel mapping, a channel map generator generates channel maps reflecting the assignment of broadcast resources during particular time periods or slots. The channel map generator may identify those time periods during which identical program material is or will be present in two or more input streams. The channel map generator may utilize, in certain embodiments, pre-arranged scheduling which is typically supplied by content providers to broadcasters, often days in advance. In other embodiments, a content comparitor may monitor two or more input data streams for sufficient correlation in content, automatically recognizing the occurrence of substantially identical input streams as they occur and making this information available to the channel map generator. For example, the input program streams may be monitored for ID sequences used by content providers to identify the subject programs. Occurrence of the same program IDs associated with two or more input programs or streams in a common time period (i.e. beginning at or near the same time) would signal occurrence of common content. In other embodiments, the program content itself could be compared. Where automatic correlation is utilized, a suitable delay period may be used such that the channel maps are not altered unless substantial identity between two or more input data streams is recognized for at least a selected time period, thereby indicating a substantial identity and not mere coincidence in content during a brief period.

In other embodiments, the broadcaster may have need for an available broadcast resource during particular time slots. The map generator may then be instructed to attempt to identify input data stream redundancies during the desired periods in order to free the needed broadcast resource(s), or may be instructed to eliminate less-desired programs if necessary and generate new maps to reflect these changes as needed in order to free the desired broadcast resources.

When the channel map generator has identified opportunities for beneficial n:n-y:m mapping, in any of the foregoing manners or otherwise, it will generate the necessary broadcast (remote) and receiver (local) maps required. The local map is then transmitted to the viewer or subscriber stations, typically by means of the broadcast medium itself. For example, the local channel maps may comprise part of a control data transmission on one or more dedicated broadcast resources. In a typical DBS system employing multiple transponders, the information may be included in an appropriate data transmission carried by each transponder so that it will be available to the IRD regardless of which transponder is tuned at any given time.

Transmission of the local map requires allocation of broadcast bandwidth, which can be counterproductive to the desired goal of maximizing bandwidth available for useful program transmission. This is particularly true in a fully dynamic system, which might require frequent transmission of new maps to accommodate changes in the program streams. For example, if the mapping scheme is accommodating numerous redundancies to free several broadcast resources, including some program streams which have relatively frequent requirements for remapping to a 1:1 correspondence (e.g. during desired commercials or source identifications), the transmission of map data could be a significant burden on the system. In other important aspects of the present invention, these difficulties are avoided by providing improved transmission and updating schemes for local maps. For example, in preferred embodiments the receiving apparatus which receives and stores the local map is adapted to receive updates to less than the complete map. In this manner, only the changed information, together with necessary overhead, is required for transmission when a map update is desired. In the case of a high capacity DBS system, this may result in significant bandwidth saving since the majority of programs, and therefore broadcast resources, will not be involved in dynamic re-mapping during most time slots. Therefore the majority of the local map may be relatively static (as in the prior art) while other portions can be dynamically updated in accordance with the present invention. Although the complete local map may preferably be transmitted occasionally (to permit activation of new equipment and provide a periodic integrity check to correct any errors) such full map transmissions are reduced.

To further minimize transmission requirements for map changes, a plurality of complete maps may be transmitted and stored locally. For example, a first complete map can be transmitted and stored, followed by a second complete map stored in other memory. The receiving apparatus includes a map selector (e.g. selection vector, multiplexor, etc.) which selects the stored map that is to be active at a given time. To accomplish a change in local mapping, it is then necessary only to cause the receiver to select the desired alternate map. More than one available map may be locally stored, and transitions between these maps may be made repeatedly. For example, one map might allocate viewer channels to the broadcast resources during normal program periods, while another map returns to 1:1 correspondence during commercials (e.g. where it is contractually required that the promotional content of an input data stream be made identically available to viewers). Although a given program might have many commercials, each requiring two map changes, only two map transmissions would be required, followed by suitable signals to initiate the necessary local map selections. These selection signals will typically require much less transmission bandwidth than a complete or partial map, resulting in significant bitstream savings.

To minimize memory requirements (e.g. in a DBS IRD), the map may be divided into individual regions or segments, such as a main map and a plurality of sub-maps. The main map (which may be considered as a specialized sub-map) can contain mapping information which is common to all of a plurality of selectable maps, while other sub-maps may include those portions of the mapping which are unique to individual selectable maps. Transition from one map to another would require selection only of the appropriate sub-map, while the main map would continue to be effective. In this manner, additional transmission resources are saved since the common portion of the several local maps need only be transmitted once, and map updates, selection and transitions are facilitated.

A standard IRD today typically includes only a single tuner. In such devices, only one LNB frequency (i.e. corresponding to a single transponder) can be selected and processed at a given time. Accordingly, only one set of entries in the local map corresponding to the broadcast resources supported by that transponder are relevant to operation of the IRD at any given time. The remaining entries are relevant only if the user selects a different viewer channel corresponding to a different transponder. Where the active local map (which may be one of a plurality of selectable maps in certain embodiments) is functionally divided into regions (e.g. a plurality of sub-maps), only one of the regions need be active at a given time. The active region will depend on the present viewer channel selected by the user. If the user selects another viewer channel supported by the same map region (e.g. another program carried by the same transponder), that region will remain active. If the user, however, selects a different viewer channel which is supported by a different region, then the latter region of the local map will become active. In other embodiments, the processing circuits and functions which maintain and update the local map(s) may recognize the active region in the local map, allowing updates to any other region or cell. In other embodiments, updates may be made to any cell of any map, including the presently active map, so long as map read cycles are preferably prohibited during any update cycles of at least the presently active cell or region.

The foregoing aspects of the present invention greatly reduce time delays and overhead requirements when making local map changes. Reducing at least some transmissions to only those portions of a map which must be updated, or eliminating at least some repetitive or redundant map information transmissions, not only reduces the amount of bandwidth required for transmitting the overhead information, but also reduces the time required for making the necessary data transmission. For example, the time required to send a complete channel map in a high capacity DBS system, utilizing generally allocated transmission resources and speeds, could be two to three seconds or longer. Typically a complete map must be received accurately before the new map can be implemented, thereby restricting how quickly the system can adapt to changing requirements. Further, certain receiving equipment may impose its own hardware or processing restrictions in activating newly delivered local maps. In other aspects of the present invention, these shortcomings are minimized or eliminated. For example, by sending only update portions of a local map (e.g. individual sub-maps), the transmission times required are significantly reduced. Further, by transmitting a plurality of alternate and/or sub-maps once, and storing them locally for later selection, subsequent transmission delays (e.g. when commercials occur during a program) are completely avoided.

To dynamically synchronize changes in the utilization of broadcast resources, the map system may include a synchronization mechanism to coordinate activation of maps. The synchronization mechanism may include a timestamp instructing map selectors when and/or how particular map information (whether complete or partial) is to become effective. By way of example, the timestamp may indicate immediate activation, or an absolute time (e.g. GMT) upon which the map is to become active. In aspects of the present invention, the timestamp may also comprise an offset or delay time after which it is to become active (e.g. two seconds after receipt, or ten frames after a trigger event, etc.); a trigger event which will cause the map to become effective (e.g. receipt of a command over a command data stream or as part of the program data stream); activation in response to action by a local user (e.g. manual selection of a local map by means of a control panel or remote control device); or other suitable means. Where an absolute timestamp is used, all apparatus can be synchronized to switch effective maps at the same instant. This will be particularly useful where changes in the input data streams are known in advance (e.g. program changes are scheduled in advance to occur at certain known times). The use of a trigger event permits greater flexibility to accommodate unscheduled changes (e.g. early or late game starts, game completions, or time-outs during a sporting event during which commercials must be 1:1 mapped to viewer channels, etc.). Where a plurality of selectable local maps are stored in local memory, they may be switched nearly instantaneously by the local apparatus on receipt of the appropriate time or trigger, resulting in a tightly synchronized and highly flexible dynamic mapping system.

Individual identity may be formed using overlays such as logos or emergency messaging data, This data is displayed based in part on a geographic identifier in the IRD.

Both the foregoing general description and the following detailed description of presently preferred embodiments are exemplary and explanatory only, and are intended to provide further explanation of the invention as claimed. The invention will be further understood by reference to the following description of preferred embodiments. taken in conjunction with the accompanying drawings. It is to be understood, however, that the description of preferred embodiments is not intended to be limiting, and the present invention and claims are not intended to be limited to the embodiments as described.

DETAILED DESCRIPTION OF THE PREFERRED EMBODIMENTS

The following description is provided with respect to a preferred system implementation. However, those skilled in the art will recognize various system implementations may be used without varying from the true spirit of the invention.

Figure 1:
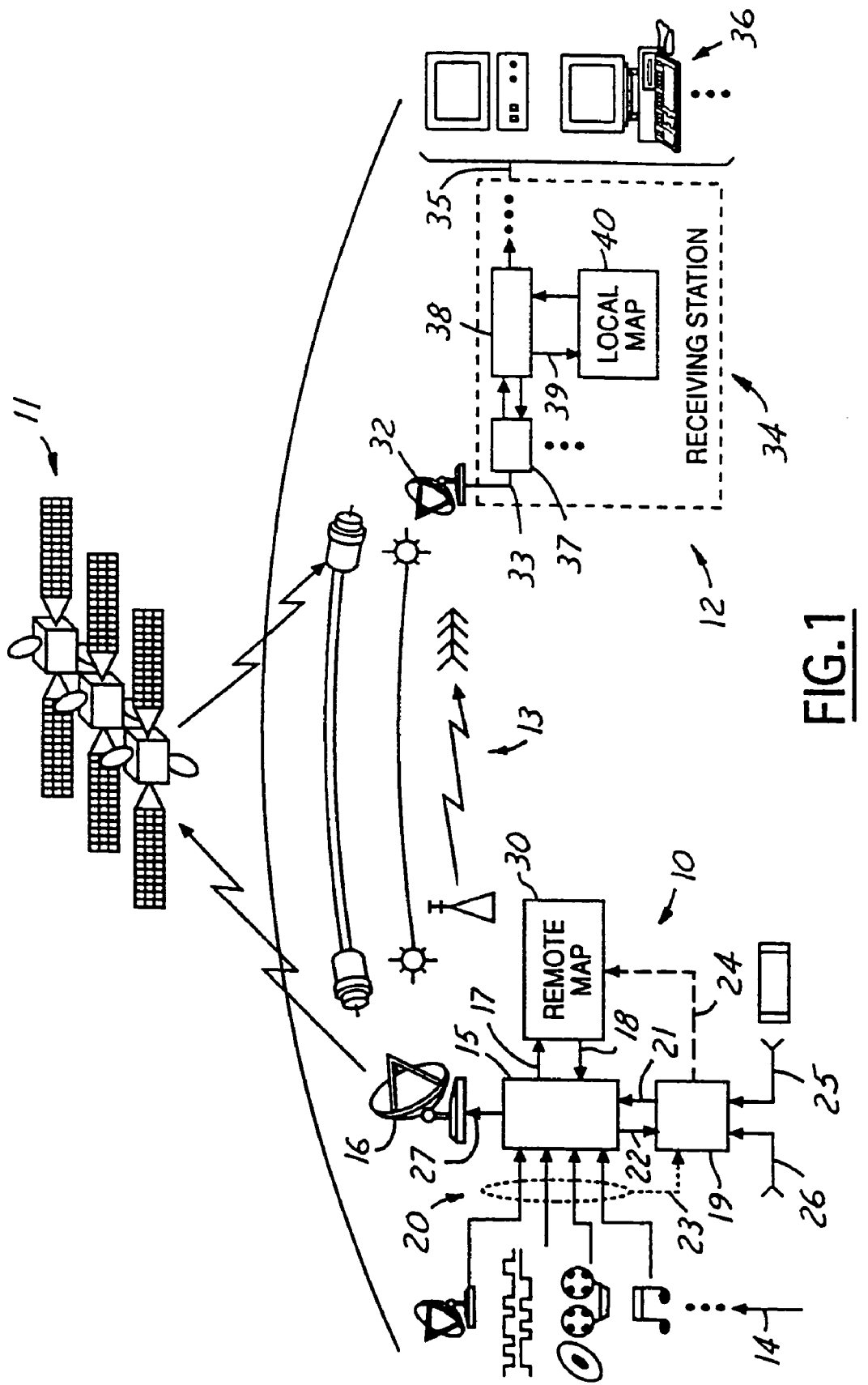
FIG. 1 is a diagrammatic depiction of a communication system incorporating the present invention, including transmission processing, broadcast, and reception processing elements.

Referring to FIG. 1, a representative communication system embodying elements of the present invention is illustrated. In particular, a direct broadcast satellite (DBS) system is illustrated, including ground-based processing and uplink facilities 10, a space relay segment comprising one or more satellites 11 (preferably in geosynchronous orbit); and one or more (preferably a multiplicity) of ground-based receiving stations 12. It should be understood, however, that alternative transmission and broadcasting methods, utilizing other space or ground-based media 13 such as cable, optical fiber, or various wireless systems, could benefit from implementation of the present invention.

The ground-based processing and uplink facility 10 may include main processing equipment 15 for receiving program inputs and generating appropriate output signals 27 for transmission to the satellites 11 by means of an uplink antenna 16. In a high capacity DBS system, a large number of individual program streams (e.g. 225 channels worth or more) may be acquired from a number of vendors or content providers. These input data streams 20 may be provided to the processing equipment 15 by any known means 14, including satellite reception; digital or analog streams supplied by terrestrial optical, cable wire-based, wireless or other systems; prerecorded programming delivered on various media including magnetic tape and optical disc; locally generated data or programming; or otherwise. For the purposes of this invention it should be understood that the input data streams may comprise video information, audio information, data services of various types (e.g. multimedia, database services, software delivery, e-mail, etc.), or other information which is desired for transmission to one or more users (e.g. subscribers). A given input program may comprise one or more input data streams (e.g. one or more video, alternative audio, and associated data streams). When these individual input data streams relate to a single program, they may be delivered via a common medium (e.g. a single prerecorded tape) or may be delivered separately.

A high capacity DBS system will typically employ a number of discrete broadcast resources, each of which may be considered as a uniquely addressable conduit for conveying a desired bitstream. For example, a number of individual transponders might be supported on one or more satellites, each transponder utilizing an assigned unique frequency band and phase. In addition and as discussed below, modern DBS systems utilize digital transmission technology to provide greater capacity and improved performance. In such a system, each transponder signal may be further multiplexed in the time domain (e.g. TDM encoding) to provide a number of individually addressable "channels" of packetized information. In such a system, the available bandwidth is divided in both the frequency, polarization and time domains, resulting in a large number of individual broadcast resources supported by the relay satellite 11 transponders. Other known or future multiplexing schemes may be employed in satellite or other distribution systems (e.g. cable or wireless systems) without departing from the scope of the present invention, so long as a plurality of individually selectable broadcast resources are supported.

An allocation of input data streams 20 to individual broadcast resources must be made by the processor 15. In particular, an allocation table or "map" 30 is maintained, which identifies the broadcast resource which is to be utilized at a given time for transmission of a particular input data stream. In preferred embodiments the map comprises addressable memory associated with the processor 15, and functions in conjunction with a controllable matrix switch or interconnection network which is part of processing equipment 15. Map 30 governs the correspondence between input data streams and uplink broadcast resources, and will be referred to herein as a transmission or "remote" map. Map output signals 18 are supplied to the processor 15 as required in order to control the interconnection network.

In order to provide the dynamic mapping capabilities which form part of the present invention, apparatus and methods are employed for flexibly and controllably updating map 30. Update signals 17 may be supplied to modify all or part of the contents of map 30, as will be discussed in greater detail below. Map generator 19 may generate update signals 21 for delivery to the processor 15, or may optionally provide direct update signals 24 to map 30. The map generator 19 determines when changes to both the remote (transmission) and local (receiver) maps are appropriate, and generates data necessary for updating the maps. The map update data may include not only revisions in broadcast resource allocations, but also a synchronization mechanism, governing when and/or how the revised information should become effective. Such map update and control information may be provided 21 to the processor 15 for inclusion in the output signal 27 for relay via satellites 11 to the receiving station(s) 12.

In order for the map generator to perform certain of the functions described herein, it requires input information identifying occasions when two or more input data streams contain, or will contain, sufficiently identical program or content material. This information may be provided from outside sources, such as advance schedules supplied by content providers. The schedule information may be received digitally (e.g. via modem or storage media) or otherwise, and input 26 to the map generator 19. Optional operator input(s) 25 (e.g. a keyboard) may also be provided. In other embodiments discussed below, the map generator 19 may compare some or all of the input data streams 23 to identify occurrences of sufficient similarity or identity, or it may receive similar information 22 from the processor 15. In these embodiments, the map generator 19 can respond automatically or in real-time to the occurrence of duplication in two or more input data streams.

The receiving station 12, in a DBS embodiment, includes a receiving dish 32 which typically comprises a signal collector (e.g. offset parabolic) and one or more low noise block converters (LNBs) which receive the satellite transponder signals. The received signal 33 is then supplied to an integrated receiver/decoder (IRD) which includes the necessary signal processing, control, and security apparatus. Among other functions, the IRD circuits 34 permit the user to select one or more desired output data stream(s) (e.g. a selected program), and tune to the appropriate broadcast resource(s) corresponding to the desired data stream(s). The selected data streams are then decoded and/or otherwise processed to generate outputs 35 for delivery to one or more user devices 36, such as a television display, audio receiver, computer, etc.

The processing circuits 34 of the IRD may include an electronically controllable tuner 37 for selecting a desired one or group of broadcast resources. For example, the tuner 37 may provide frequency and polarization selection, to select one of a group of broadcast resources. In typical IRD, polarization selection is accomplished at the LNB, and frequency selection is accomplished by a frequency-agile tuner. Tuner 37 may be understood to comprise all such elements or functions required for selection of a single incoming signal. Tuner 37 may also be considered to include elements or functions for identifying, in a selected incoming signal, those individual packets in a data stream corresponding to one or more selected output data streams. Other tuners and methods of tuning appropriate to alternative broadcast media and encoding schemes may, of course, alternatively be utilized. The signal(s) may then be provided to further processor(s) 38 for generating the desired output signal(s) 35. Processor(s) 38 may include, for example and without limitation, buffering, decrypting, and decompression functions, and appropriate output drivers.

In order to make the correct selection of the particular broadcast resource or resources corresponding to the desired output (e.g. viewer channel), a "local" map is utilized. Similar to the remote map, the local map provides a correspondence between incoming broadcast resources and selectable output data streams. Thus, if a viewer wishes to watch a particular program which is advertised as available on a given viewer channel generated by the IRD, the local map will contain the necessary correlation between that viewer channel output and the one or more broadcast resources which will be carrying the desired program information at the desired time. The local map 40 may communicate with the processors 38, both to supply the appropriate local map information required for setting tuner 37 to correspond to a user channel selection, and also to receive update signals 39 to the local map 40, as will be discussed in greater detail below.

Figure 2:
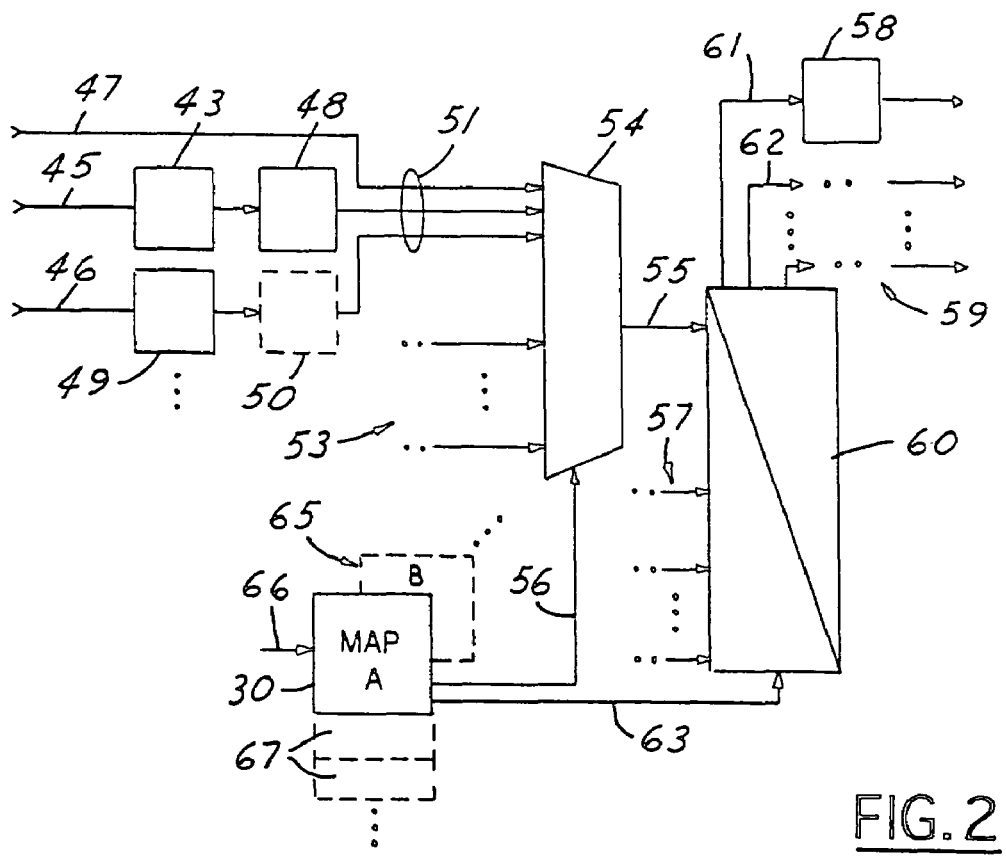
FIG. 2 is a conceptual block diagram of an uplink signal processing system (USPS) useable in the system of FIG. 1.

FIG. 2 diagramatically illustrates functions performed by an uplink facility 10, including an uplink signal processing system (USPS). A particular program input stream may include video information signals 45, one or more audio channels 46, and data 47. Data 47 may comprise program-related user data, general user data of various types, and/or control data (which may be generated by other portions of the uplink processing system). Data 47 may also include geographic identifiers, logos, emergency messaging system data or combinations thereof. The video signals 45 may be subjected to video compression 43 (e.g. MPEG-2), thereby substantially reducing the bandwidth required for transmission of acceptable quality video. The compressed video may then be subjected to encryption 48 for security encoding to prevent unauthorized reception or use of the broadcast signal. The audio input(s) 46 may similarly be encoded 49 (e.g. MPEG or AC3) and optionally encrypted 50. The thus-processed video, audio and data signals may be considered as a set 51 corresponding to a given program. Similar processing may be performed on a large number of additional video, audio and/or information inputs, including other sets and/or individual data inputs. It should be understood that different input data streams may be processed differently. For example, the video encoder 43 and encryptor 48 may not be required for an audio-only channel. Further, control data 47 may not be required with each pro-ram data stream, or a program data stream may comprise entirely computer data intended for reception and use by a user's computer equipment (e.g. multimedia programming, software distribution, etc.). Control data may be encoded, encrypted and/or compressed.

The data streams, together with a number of other data streams 53, are processed and multiplexed by a packet multiplexor 54 to generate a multiplex data stream 55. This multiplex data stream may, for example, comprise the output intended for transmission over a selected frequency, for rebroadcast by a particular transponder on a particular satellite. Multiplexor 54 may preferably perform a time division multiplexing of the various data streams 51, 53 according to an appropriate protocol utilized by the DBS or other broadcast system. In a well-known example, the individual data streams are divided into individual packets, each with an identifying header or ID. The ID corresponds to an individual "channel" in the resulting data stream 55, and individual segments of the programs will be reassembled at the receiving end by means of this header or ID information. Because the individual packets in the data stream 55 correspond to unique data channels, they correspond to individual broadcast resources in the final broadcast signal. Accordingly, it is necessary for the uplink facility equipment to assign individual input data streams to appropriate packet "virtual channels" by appending the appropriate header ID, according to the desired remote mapping. For this reason, multiplexor 54 is supplied with map information 56 from the remote map 30.

In a typical high capacity DBS system, the satellites 11 will support a plurality of frequency channels, by means of individual transponders operating at different frequencies and/or polarizations. In such a system, a plurality of multiplex data streams 55, 57 may be supplied to individual transmission circuits 58, 59. This may be accomplished by an electronically controllable interconnection network 60, which receives a plurality of input signals 55, 57 and connects them selectively to a corresponding plurality of outputs 61, 62 corresponding to individual transmission circuits 58, 59. The interconnection network 60 must also be provided with transmission map information 63, in order to accurately perform the frequency domain portion of the complete mapping of input data streams to individual broadcast resources. Although network 60 and multiplexor 54 are shown as separate elements, it should be understood that their circuits and/or functions can be combined, and many equivalent configurations will be known to those skilled in the art.

Figure 3:
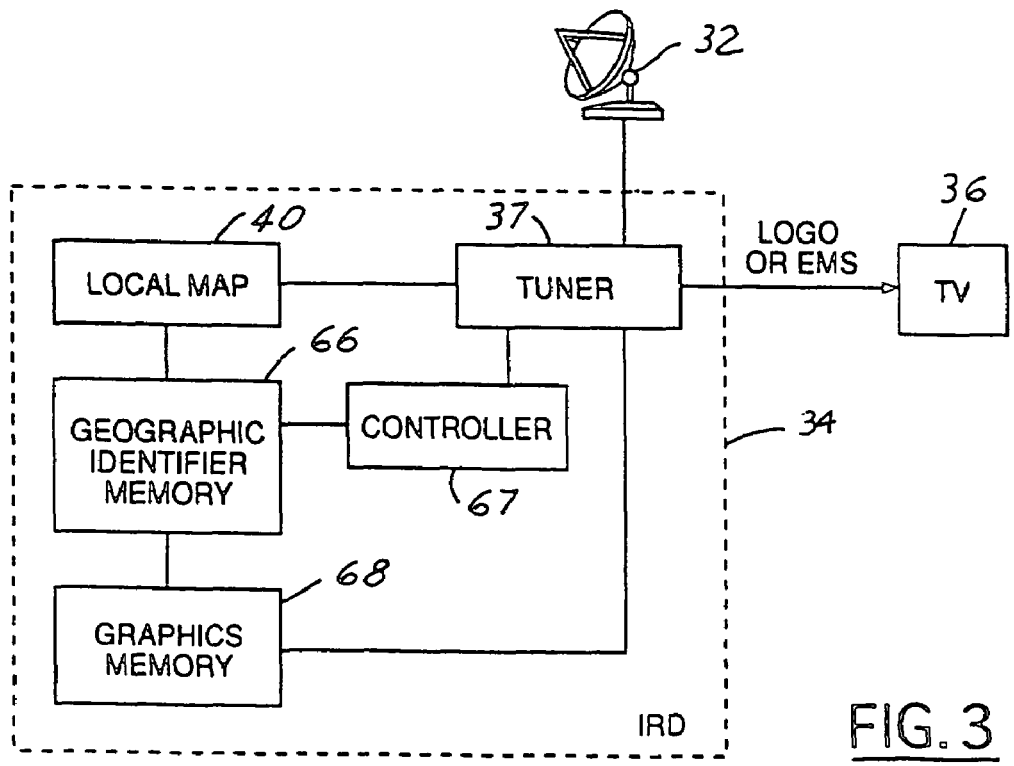
FIG. 3 is a block diagram of a preferred IRD system of FIG. 1.

Referring now to FIG. 3, a high level simplified block diagrammatic view of IRD circuit 34 is illustrated. IRD circuit 34 has been simplified to highlight the present invention. The same reference numerals of the same components used above relative to FIGS. 1 and 2 are used in FIG. 3. In addition to local map 40, tuner 37, user device 36 and dish 32, a geographic identifier memory 66, an overlay or graphics memory 68 and a controller 69 are incorporated therein. Geographic identifier memory 66 is used to store a geographic identifier for IRD circuit 34. The geographic identifier stored in geographic identifier memory 66 may include but is not limited to a zip code, a portion of the telephone number such as the area code or exchange, or actual physical longitude and latitude locations such as those provided by a mobile positioning system.

Geographic identifier memory 66 may have the geographic identifier information automatically stored therein or may be input manually. In existing systems, IRD circuit 34 is in communication with a processing center through the telephone lines. The processing center may, for example, load geographic identified memory 66 with the zip code or portion of the telephone number from the billing information over the circuit 34 or via the satellite path.

Graphics memory 68 is used to store logos of the logo affiliates. Graphics memory 68 may be preloaded with the logos of the local affiliate. Also, graphics memory 68 may be loaded from the central processing center through the land lines to which IRD circuit 34 is connected or via the satellite path.

Controller 67 is illustrated as a separate component. However, controller 67 may be part of the control or processing circuitry described above. Controller 67 is capable of comparing the geographic identifier, receiving the overlay, and controlling the display of the overlay on the received broadcast signal.

Figure 4:
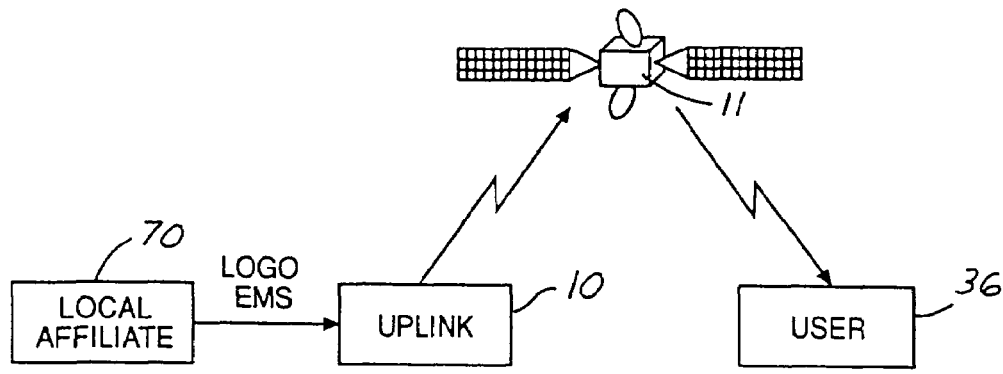
FIG. 4 diagramatically illustrates representative operation of embodiments of the present invention.

Referring now additionally to FIG. 4, graphics memory 68 may also be loaded using a local broadcast affiliate 70. Local affiliate 70 may provide logo information to uplink facility 10 which is then coupled to satellites 11 and then downlinked to user devices 36. In addition to logo information from local. affiliate 70, emergency messaging service data may also be provided in a similar manner.

Figure 5:
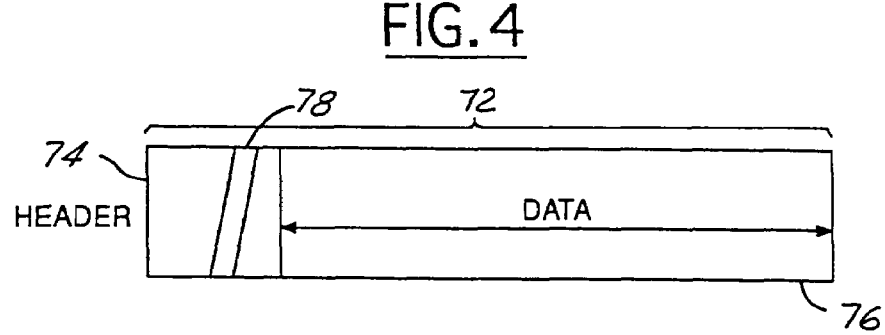
FIG. 5 is a diagrammatic representation of a broadcast signal of the present invention.

Referring additionally now to FIG. 5, a packet 72 of broadcast information is illustrated. Packet 72 includes a header 74 and data 76. Header 74 may include a geographic identifier 78 therein. The geographic identifier 78 may be particularly useful in identifying particular devices on which to store logo information or in which to identify the signal as an emergency messaging system signal destined for a particular geographic region. In operation, the integrated receiver decoder circuit 34 has a geographic identifier 66 stored therein. A broadcast signal is generated and the broadcast signal, in response to the geographic identifier, has an overlay displayed on the broadcast signal. The overlay is stored in graphics memory 68 and may include a station logo. The overlay may include text or graphics or a combination of the two to form an affiliate logo.

As mentioned above, the data 76 may include emergency messaging system information or logo information. The data 76 such as a logo may be stored in graphics memory 68 upon comparison of the geographic identifier memory content 66 with the geographic identifier within the header 74. That is, when a local affiliate broadcasts a logo, the logo may be stored in geographic identifier memory 66. Preferably, geographic identifier memory 66 may comprise a number of logos corresponding to each of the received channels. Such logos may be broadcast periodically such as at low use hours.

As mentioned above, the present system may be used in conjunction with a data transmission system that determines redundancies in signals and therefore uses one of the redundant signals to be broadcast. The local map selectively associates the selected broadcast resources to the output data streams. The controller 67 determines which overlay from 68 to apply to the signal. Thus, even though a viewer selection may, for example, choose a local channel, the network version of the same broadcast (not the local affiliate) may be chosen to be broadcast over the broadcast resource while the user's integrated receiver decoder applies the proper logo thereover. Thus, the receiver has a number of output data streams greater than the allocated number of broadcast resources, the output data streams being substantially identical in relevant content to a similar number of input data streams.

As mentioned above, such a system may be useful in cable systems as well as digital satellite broadcast systems.

The system may also be used for emergency messaging systems (EMS) as described above. Emergency messaging system operation is similar to that described above with respect to a logo. A geographic identifier is stored in a receiving device. An emergency message signal having an emergency message graphic identifier is broadcast, typically from a local affiliate. The emergency messaging system data is relatively low data rate and therefore may be broadcast in addition to one of the redundant signals. Since the EMS data stream for a given affiliate is quite low, several EMS streams can be broadcast with the common redundant video/audio. The emergency messaging system geographic identifier is compared to the geographic identifier of the receiver. The emergency messaging system signal is displayed when the user geographic identifier corresponds to the emergency messaging system graphic identifier. The viewers in a given locality then have the benefit of the national television feed and the localized emergency messaging.

Figure 6:
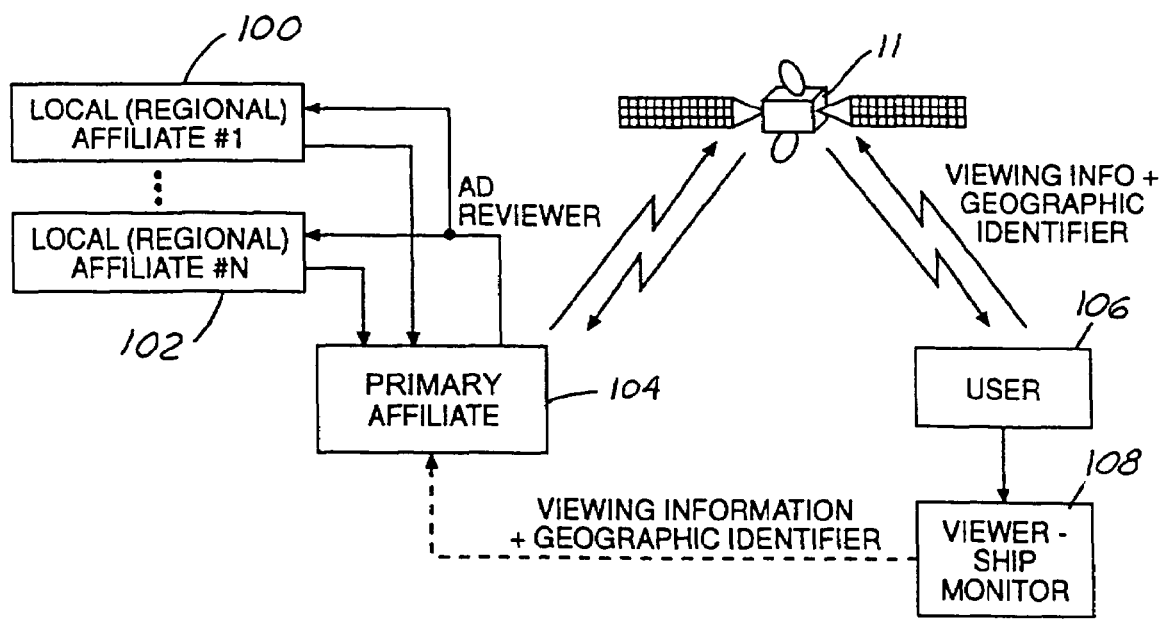
FIG. 6 is a system level view of a compensation method of local affiliates.

Referring now to FIG. 6, local network affiliates may lose revenue due to commercial advertising when its signal is replaced by another signal during times of redundancy. Thus, a novel means for compensating local affiliates has been developed. Local network affiliates requiring compensation are referred to by reference numerals 100 and 102. Each of these may be coupled to a primary affiliate 104 that broadcasts or uplinks signals to a satellite 11. These signals may be uplinked directly to satellite 11 or through an uplink center as described above. The data is then broadcast from satellite 11 to users 106. Viewership monitor 108 may be used to monitor the viewing habits of users in various regions. Viewership monitor 108 may take place over the satellite 11 or may take place through a low data rate line such as a phone line. Viewership monitor 108 relates information as to the viewing of users in the various geographic regions. That is, the various geographic identifiers located with user 106 will be communicated back to a central location such as primary affiliate 104 wherein ad revenue may be divided among the local or regional affiliates 100 through 102. Such an arrangement may be also useful for overlays such as emergency messaging system information and logo information. The logo affiliates may communicate such information to the primary affiliate 104 so that it is broadcast by satellite 11. Thus, by comparing the geographic identifier of the user with the various broadcast signals, the proper logos or emergency messaging system information may be overlaid onto the viewer's display.

It is also contemplated that the primary affiliate may receive a national signal and insert local advertising which is then combined and provided to the uplink center. In this manner, the local affiliates may agree to compensate one another for lost ad revenue based on direct estimates or third party estimates of viewership data.

While particular embodiments of the invention have been shown and described, numerous variations and alternate embodiments will occur to those skilled in the art. Accordingly, it is intended that the invention be limited only in terms of the appended claims.

What is claimed is:

1. A method of broadcasting comprising the steps of:
   storing a user geographic identifier in a receiver;
   generating a broadcast signal from a substitution of a second input data stream from a second source for a first input data stream from a first source if the second input data stream has substantially common content as the first input data steam;
   applying an overlay identifying the first source onto said broadcast signal in response to said geographic identifier; and
   displaying said overlay and said broadcast signal.

2. A method as recited in claim 1 wherein said step of applying an overlay comprises the step of overlaying text onto said broadcast signal.

3. A method as recited in claim 1 wherein said step of applying an overlay comprises the step of overlaying graphics onto said broadcast signal.

4. A method as recited in claim 3 wherein said graphics comprises a station logo.

5. A method as recited in claim 1 further comprising the step of generating a broadcast signal including a broadcast geographic identifier.

6. A method as recited in claim 1 further comprising the steps of broadcasting said overlay having an overlay geographic identifier; comparing the user geographic identifier with the overlay geographic identifier, and storing the overlay into an overlay memory in the receiver when the user geographic identifier corresponds to the overlay geographic identifier.

7. A method as recited in claim 1 wherein the geographic identifier comprises a zip code.

8. A method as recited in claim 1 wherein the geographic identifier comprises a telephone number.

9. A method as recited in claim 1 wherein the step of generating comprises generating said broadcast signal through a high altitude platform.

10. A method as recited in claim 9 wherein said high altitude platform comprises a satellite.

11. A broadcasting system comprising:

an uplink facility generating a broadcast signal, the broadcast signal having a second input data stream from a second source substituted for a first input data stream from a first source if the second input data stream has substantially common content as the first data stream;

a receiving device for receiving the broadcast signal, said receiving device including an overlay memory storing an overlay identifying the first source;

a receive circuit for receiving said broadcast signal;

a geographic identifier memory storing a receiver geographic identifier; and a controller for overlaying said overlay onto said broadcast signal in response to said receiver geographic identifier.

12. A broadcasting system as recited in claim 11 wherein said broadcast signal comprises a broadcast geographic identifier, said controller comparing the broadcast geographic identifier with said receiver geographic identifier, and overlaying said overlay in response to comparing.

13. A receiving device for a broadcasting system comprising:

a receive circuit for receiving a broadcast signal, the broadcast signal having a second input data stream from a second source substituted for a first input data stream from a first source if the second input data stream has substantially common content as the first data stream;

an overlay memory storing an overlay identifying the first source;

a geographic identifier memory storing a geographic identifier;

a controller and signal processing circuit for overlaying said overlay onto said broadcast signal in response to said geographic identifier.

14. The device of claim 13, wherein said broadcast signal comprises output data streams, and the device further comprises a local map selectively associating broadcast resources to the output data streams.

* * * * *